United States Patent [19]
Yoshinari

[11] Patent Number: 5,416,693
[45] Date of Patent: May 16, 1995

[54] MOVING PICTURE SEARCH SUPPORT DEVICE

[75] Inventor: Toshiaki Yoshinari, Kanagawa, Japan

[73] Assignee: Fuji Xerox Co., Ltd., Tokyo, Japan

[21] Appl. No.: 935,200

[22] Filed: Aug. 26, 1992

[30] Foreign Application Priority Data

Aug. 28, 1991 [JP] Japan .................. 3-271775

[51] Int. Cl.⁶ .............................. G06F 19/00
[52] U.S. Cl. .................................. 364/400
[58] Field of Search ............... 364/400, 443; 358/105, 358/93; 360/33.1, 13, 14.2-14.3; 369/69

[56] References Cited

U.S. PATENT DOCUMENTS 4,924,387  5/1990  Jeppesen ..................... 364/409
4,969,036  11/1990 Bhana et al. ................. 358/105

Primary Examiner—Gail O. Hayes
Assistant Examiner—F. Poinvil
Attorney, Agent, or Firm—Finnegan, Henderson Farabow, Garrett & Dunner

[57] ABSTRACT

A moving picture search support device allows a particular scene or frame to be searched quickly and surely from a moving file that has been accessed in the past based on weighing that is derived from an evaluation made by the degree of importance. The device of the invention, which is used to reproduce a moving picture, includes an operation history storage unit and a history calculating unit. The operation history storage unit stores history data that has been given a predetermined weight corresponding to an operation mode selected for processing a moving picture file by a user. The history calculating unit determines, in response to a search request made by the user for desired moving picture data within the moving picture file, a priority level at which the desired moving picture data is displayed in accordance with the predetermined weight based on the history data stored in the operation history storage unit.

10 Claims, 7 Drawing Sheets

FIG. 3

| | DATE 31 | SLOW SCAN 32 | PLAY 33 | FAST SCAN 34 |
|---|---|---|---|---|
| A | '90.9.6 | #120-150 | #100-125 | #50-90 |
| B | --- | #140-180 | #170-300 | — |
| C | '90.10.1 | — | #132-980 | — |
| D | '90.10.5 | #250-280 | #200-400 | #150-450 |
| E | --- | #430-450 | — | #250-300 |
| F | '90.10.5 | — | #400-450 | — |
| G | '90.10.5 | #125-125 | #0-200 | #800-900 |
| H | --- | #161-179 | #100-400 | #150-250 |

| | GROUP ID | 1 | 2 | 3 | 4 | 5 | 6 | 7 | 8 |
|---|---|---|---|---|---|---|---|---|---|
| X | | | | | | | | | |
| Y | ADDRESS | #50-90 | #100-119 | #120-125 | #126-139 | #140-150 | #151-169 | #170-180 | #181-300 |
| Z | WEIGHT | 1 | 2 | 5 | 3 | 6 | 3 | 5 | 2 |

50

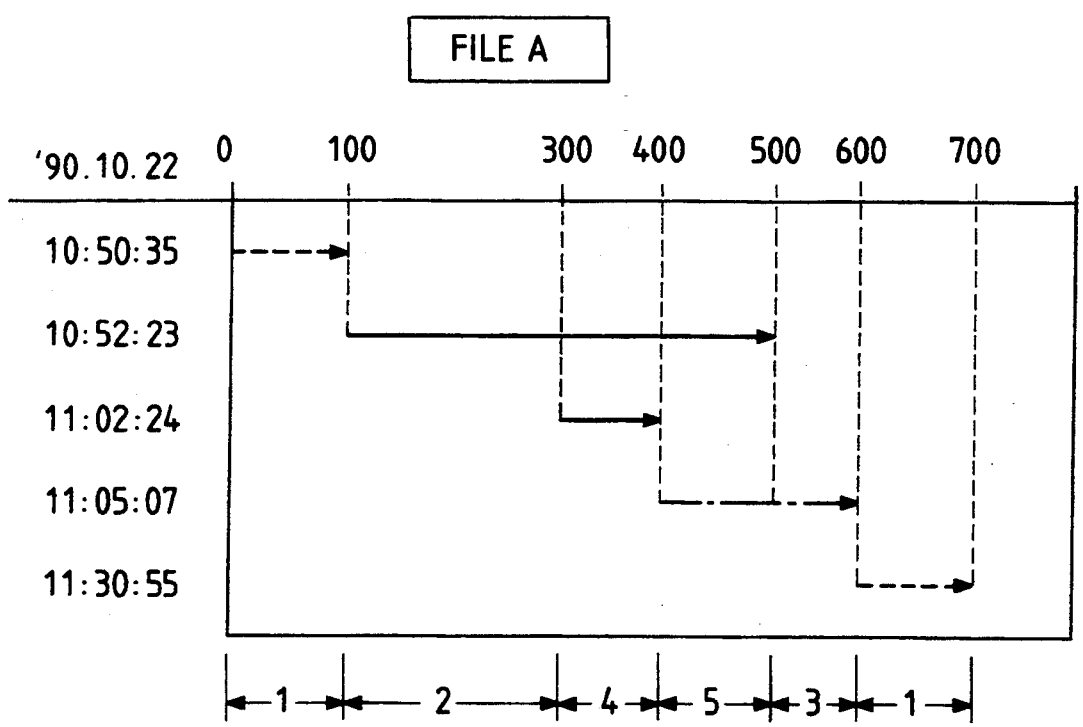

| GROUP ID | 5 | 3 | 7 | 4 |
|---|---|---|---|---|
| ADDRESS | #140-150 | #120-125 | #170-180 | #126-139 |
| WEIGHT | 6 | 5 | 5 | 3 |
| | 6 | 2 | 8 | 1 |
| | #151-169 | #100-119 | #181-300 | #50-90 |
| | 3 | 2 | 2 | 1 |

} 51

MOVING PICTURE SEARCH SUPPORT DEVICE

BACKGROUND OF THE INVENTION

1. Field of the Invention

The invention relates to moving picture search support devices. More particularly, the invention is directed to a moving picture search support device that allows a particular scene or frame to be searched quickly and surely from a moving picture file that has been accessed in the past.

2. Description of the Related Art

It often happens that a user must search a desired scene or frame to his personal interest or for office use from among moving picture files such as video films that have been viewed in the past. By the way, in this case, the conventional searching technique is to rely on the user's weak memory while repeating the forwarding or reproducing of a target moving picture file, which, however, is a very inefficient technique.

To improve such inefficient technique, the following techniques have been proposed. (1) Changes in scene are detected on a display screen by using a time-related correlation of an image (A. Nagasaka and Y. Tanaka (Engineering Department, Hokkaido University), "A Method of Automatically Detecting Changes in Scene in Video Films," 40th National Convention of Information Processing Society (First Term, 1990), pp. 642–643). (2) The motion of a moving body on a display screen is extracted, and a desired scene or frame is searched using such extracted motion (H. Ueda (of Central Research Institute, Hitachi, Ltd.), "Proposal of an Interactive Method of Editing Moving Pictures," Institute of Electronics and Communication Engineers of Japan Technical Research Report [Image Engineering], pp. 39 to 46).

However, these techniques require that predetermined image processing be performed every frame that expresses an image, and this entails enormous time.

SUMMARY OF THE INVENTION

The invention has been made to overcome the above-mentioned problem associated with the conventional art. Accordingly, an object of the present invention is to provide a moving picture search support device capable of efficiently searching a predetermined scene or frame from a moving picture file that has been accessed in the past by a user.

A moving picture search support device of the invention, which is used to reproduce a moving picture, includes an operation history storage unit and a history calculating unit. The operation history storage unit stores history data that has been given a predetermined weight corresponding to an operation mode selected for processing a moving picture file by a user. The history calculating unit determines, in response to a search request made by the user for desired moving picture data within the moving picture file, a priority level at which the desired moving picture data is displayed in accordance with the predetermined weight based on the history data stored in the operation history storage unit.

The moving picture search support device of the invention which is used to reproduce a moving picture stores and registers, in correspondence with a predetermined operation mode (e.g., Slow Scan, Play, Fast Scan) for target moving picture data, data such as address data of a predetermined physical media in which the target moving picture data is stored, a date on which the target moving picture data has been accessed, and predetermined weighing data expressing a level of importance of the target moving picture data. Examples of the address data include a start address for starting one of various types of operation modes and an end address for ending such operation mode. The history calculating unit that is similarly provided in the moving picture search support device makes a predetermined evaluation every address based on operation history data stored in the operation history storage unit, and indicates to the user addresses corresponding to moving picture data selected as a candidate in accordance with a priority level determined from a result of the evaluation. And when the user selects the addresses corresponding to the moving picture data indicated by the priority level, the scene or frame of a desired moving picture can be displayed on an appropriate display section more efficiently.

BRIEF DESCRIPTION OF THE DRAWINGS

The accompanying drawings, which are incorporated in and constitute a part of the specification, illustrated presently preferred embodiments of the invention and, together with the general description given above and the detailed description of the preferred embodiments given below, serve to explain the principles of the invention. In the accompanying drawings:

FIG. 3 is a diagram showing a format of an operation history file created at the time of registering the history data in the embodiment of FIG. 1;

FIG. 5 is a diagram illustrative of an evaluation of moving picture data in the embodiment of FIG. 1;

FIG. 6 is a diagram illustrative of another exemplary evaluation of moving picture data in the embodiment of FIG. 1;

DESCRIPTION OF THE PREFERRED EMBODIMENTS

Figure 1:
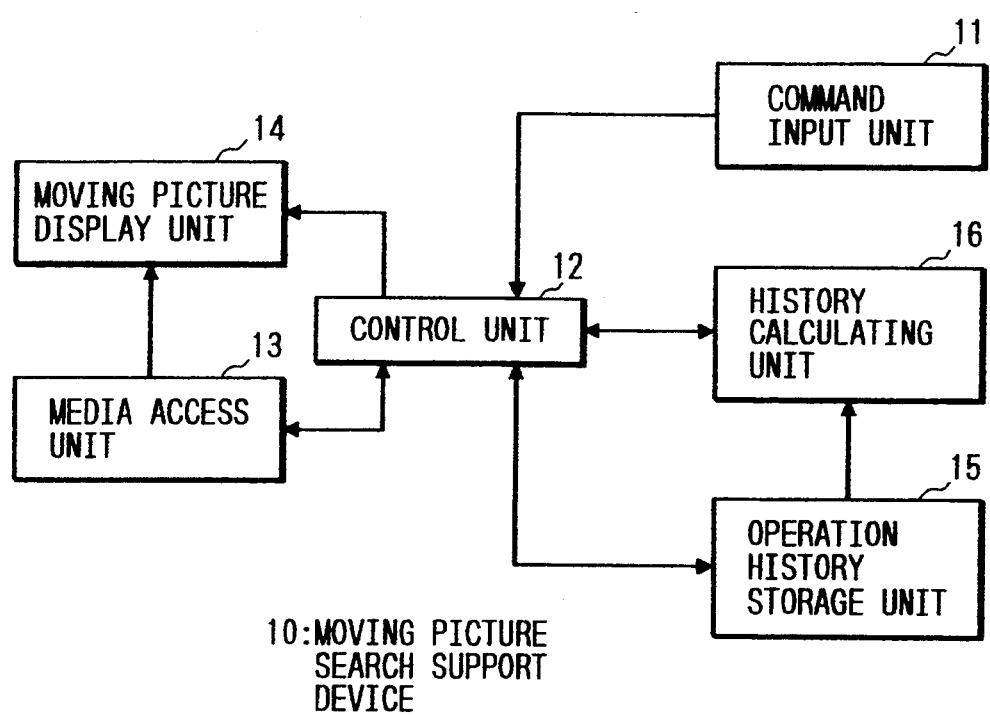
FIG. 1 is a schematic diagram showing a configuration of a moving picture search support device, which is an embodiment of the invention.

FIG. 1 is a schematic diagram showing a configuration of a moving picture search support device, which is an embodiment of the invention. In FIG. 1, reference numeral 11 designates a command input unit that receives a predetermined instruction from a user. While instructions from the user include direct actions from an input means such as a mouse or keyboard and instructions by script files, these instructions are hereinafter collectively referred to as "user instructions." Reference numeral 12 designates a control unit, which controls, e.g., the following operation, which are: the operation of converting a command input from the command input unit 11 and a history calculation data from a history calculating unit 16 into formats that can be recognized by a media access unit 13 and transfers the converted data to the media access unit 13; the operation of transferring to an operation history storage unit 15 the addresses and corresponding date data in response to the addresses from the media access unit 13, and the like; and the operation of transferring to a moving picture display unit 14 data corresponding to the display position and size of an image in a display screen. The media access unit 13 accesses an appropriate physical media (e.g., a hard disk or a laser disk, etc.) in accordance with a predetermined command from the control unit 12 and transfers moving picture data to the moving picture display unit 14, or transfers the corresponding address data in this physical media to the control unit 12. The moving picture display unit 14 displays a moving picture corresponding to predetermined moving picture data from the media access unit 13 while applying a predetermined enlarging/reducing process that changes the moving picture to an appropriate display size based on the display position of the moving picture instructed from the control unit 12. The moving picture display unit 14 also displays other predetermined user interfaces such as a predetermined icon in a window section (not shown) thereof in which the moving picture is displayed. The operation history storage unit 15 stores and registers address data in a physical media corresponding to the access date of target moving picture data or to a predetermined operation mode for the target moving picture data. And the history calculating unit 16 makes a predetermined evaluation of each address based on the operation history data stored in the operation history storage unit 15, determines a priority level of each address to be indicated to the user based on a result of such evaluation, and transfers the corresponding address data to the control unit 12 in accordance with the priority level based on such determination. These units from the command input unit 11 to the history calculating unit 16 constitute the moving picture search support device 10, which is the embodiment of the invention.

Figure 2:
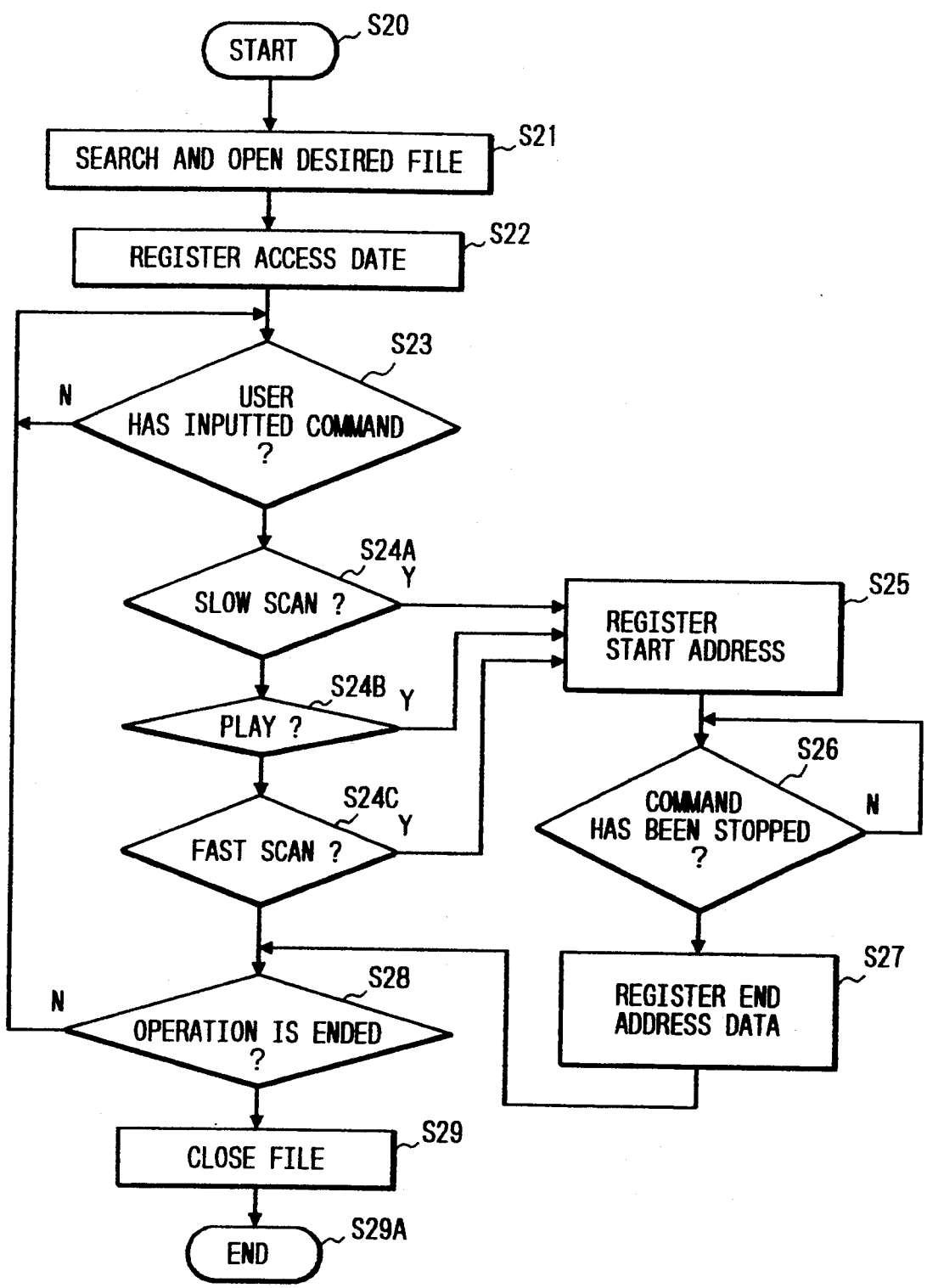
FIG. 2 is a flowchart illustrative of an operation to be performed at the time of registering history data in the embodiment of FIG. 1.

FIG. 2 is a flowchart illustrative of an operation at the time of registering history data in the above-mentioned embodiment. FIG. 3 is a diagram showing a format of an operation history file to be created during the history registration. If the operation of registering history data by the moving picture search support device 10 has been started (S20), a moving picture file desired by a user is instructed to the moving picture search support device 10 by the user based on a predetermined instruction. At this point, an operation history file corresponding to the moving picture file desired by the user is searched and opened (S21) by the control unit 12 (the operation history file is stored in the operation history storage unit 15). If the desired operation history file is not found at this point, a corresponding operation history file is created and stored in the operation history storage unit 15. Then, data relating to the access date of the desired operation history file is transmitted to the operation history storage unit 15 by the control unit 12, and stored and registered at a predetermined position (S22). When it is judged whether or not the user has inputted a command (S23), whether or not the following instruction is included in the user instruction from the command input unit 11 is judged at the control unit 12. That is, it is checked that an instruction for sending a command for executing an operation to the media access unit 13 is included. The operations to be executed by the commands are: Slow Scan (a first operation mode featuring reproduction slower than at a normal speed and including the operation of leaving a moving picture stationary); Play (a second operation mode featuring reproduction at the normal speed), and Fast Scan (a third operation mode featuring reproduction faster than at the normal speed and excluding the operation of fast forwarding or rewinding that involves no display of moving pictures. Here, when there is a command corresponding to Slow Scan, which is the first operation mode (S24A); when there is a command corresponding to Play, which is the second operation mode (S24B); or when there is a command corresponding to Fast Scan, which is the third operation mode (S24C), a request is sent from the control unit 12 to the media access unit 13 so that predetermined address data (such as a frame number at which the target moving picture data is stored or a time code) at a current access point of a target physical media is transferred, prior to transferring one of the above commands to the media access unit 13. When the predetermined address data is transferred from the media access unit 13 in response to the request, the control unit 12 delivers various data and address data corresponding to one of the above three operations to the operation history storage unit 15. The operation history storage unit 15 registers a start address at a predetermined position depending on the operation mode (S25). The control unit 12 then sends to the media access unit 13 a command for executing one of the three operation modes. For example, if the command corresponding to the second operation mode is being executed, desired moving picture data is accordingly read from a physical media and transferred to the moving picture display unit 14 to be displayed in a normal display mode on a corresponding display screen (not shown). The commands for the first and third operation modes are executed in the same manner except for the corresponding display modes on the display screen. In Step S26, while executing a command corresponding to a predetermined operation mode as described above, it is checked that a user instruction (stop instruction) for stopping the execution of a command corresponding to a predetermined operation mode has been applied from the command input unit 11 to the control unit 12 through a periodic check. When the stop instruction has been applied, such stop instruction is transferred to the media access unit 13 through the control unit 12. In accordance therewith, the media access unit 13 informs the control unit 12 that the execution of the command corresponding to the operation mode has been stopped. At this point, the control unit 12 sends a request to the media access unit 13 so that predetermined address data such as a frame number at which the target moving picture data is stored or a time code, or end address data for stopping the execution of the corresponding operation mode in this case) at a current access point of a target physical media can be transferred, in a manner similar to starting the execution of the corresponding operation mode. And in Step S27 the data relating to the end address for stopping the execution of the corresponding operation mode, which has been received from the media access unit 13 through the control unit 12, is registered at a predetermined position in the operation history storage unit 15. The above-mentioned operation is continued until the user instructs the operation to be ended (S28). When the user gives an operation end instruction, the operation history file stored in the operation history storage unit 15 and the moving picture file stored within the physical media in correspondence with the operation history file are closed (S29), putting the predetermined registration operation of the corresponding moving picture data to an end (S29A). FIG. 3 will roughly be described. Item sections contained in an operation history file 30 corresponding to a particular moving picture data file include, e.g., a date section 31, a first operation mode (Slow Scan) section 32, a second operation mode (Play) section 33, a third operation mode (Fast Scan) unit 34, in which mode the moving picture data files are operated. Taking a look at row A in FIG. 3, the following can be understood. The date on which a moving picture data file was operated is '90.9.6; the first operation mode, Slow Scan, was present from #120 (start address) to #150 (end address); the second operation mode, Play, was present from #100 (start address) to #125 (end address); and the third operation mode, Fast Scan, was present from #50 (start address) to #90 (end address) in the file. With respect to row B, the following can be understood. The date on which a moving picture data file was operated is '90.9.6 as row A (the expression "- - -" indicates that the date is the same as above and is used to avoid repetition); the first operation mode, Slow Scan, was present from #140 (start address) to #180 (end address); the second operation mode, Play, was present from #170 (start address) to #300 (end address); and the third operation mode, Fast Scan, was not present (the expression "-" indicates that no operation mode was present) in the file. The same applies from rows C to H.

Figure 4:
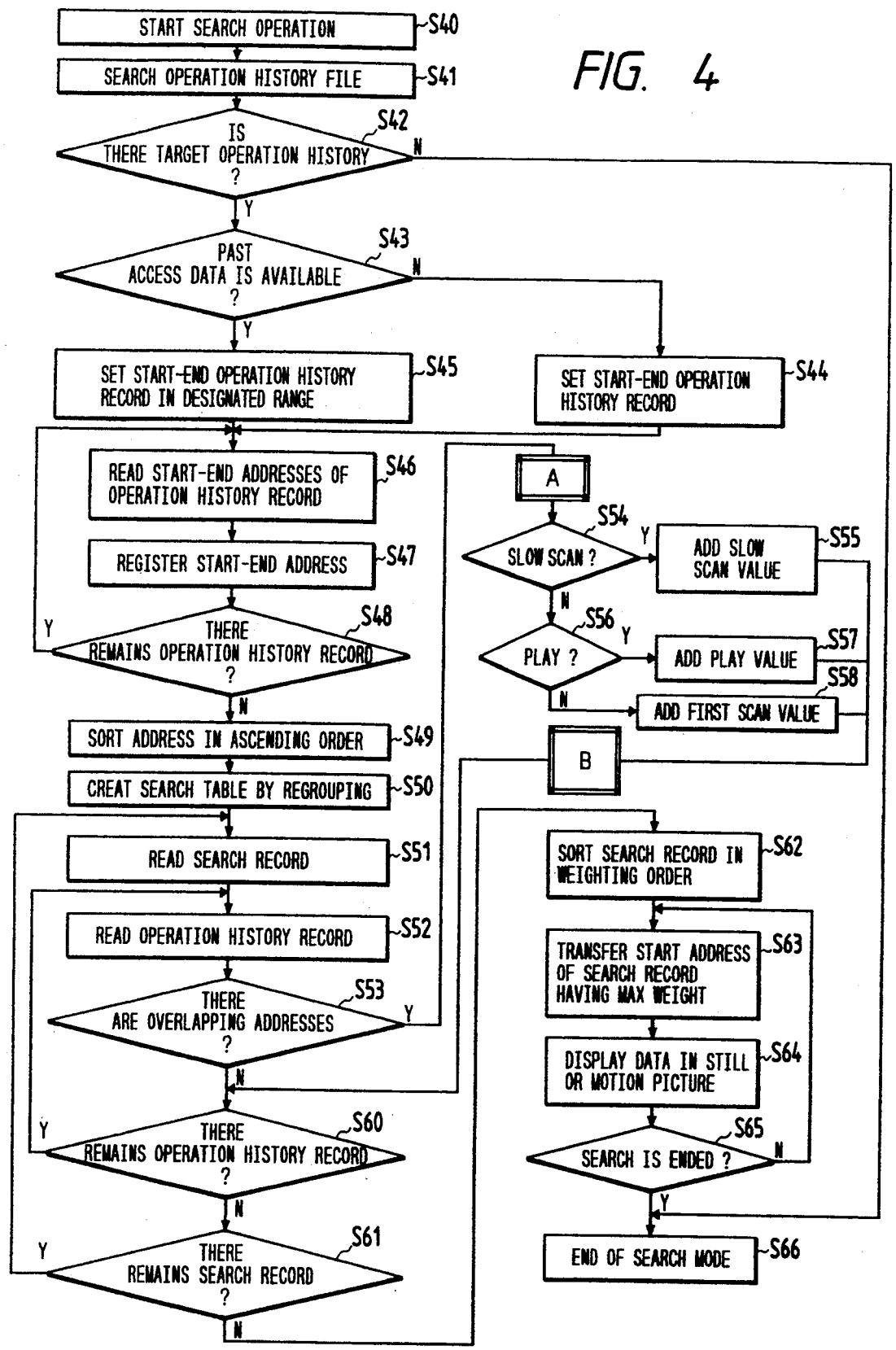
FIG. 4 is a flowchart illustrative of a search operation performed using a registered operation history file in the embodiment of FIG. 1.

FIG. 4 is a flowchart illustrative of a search operation using registered operation history files in the above-mentioned embodiment. FIG. 5 is a diagram illustrative of a weighing evaluation of target moving picture data during the search operation in the above-mentioned embodiment. Assuming that the search operation has been started by the moving picture search support device 10 based on an instruction inputted by the user from the command input unit 11 (S40). Then, the control unit 12 requests the history calculating unit 16 to find addresses of a moving picture file required for each search operation mode. The history calculating unit 16 searches a corresponding operation history file 30 (see FIG. 3) stored in the operation history storage unit 15 (S41). It is judged whether or not there is such target operation history file (S42). If the file is not found, the processing is terminated; if the file has been found, the processing proceeds to Step S43. In Step S43 it is judged whether or not a past access date of the moving picture file is found in the search instruction inputted by the user. If the past access date of the moving picture file has been found in the search instruction by the user, a start-end operation history record is set so that the search range is defined based on the access date (S44). That is, the search range is specified based on the access date. If, on the other hand, the user does not specify a past access date in the search instruction, then start-end operation history records are set throughout the operation history file 30. For example, if the user instructed to search data that have been accessed prior to September 1990, then operation history data as of '90.9.6 is to be used. That is, only the operation history data stored on rows A and B in the operation history file 30 will be used. Successively, the start and end addresses of each operation history record are read and registered one by one for all the existing operation history records, and the start addresses are then sorted in the ascending order (S46 to S49).

As is understood from the description with reference to FIG. 3, in the operation history file 30 is a single group formed every operation mode of a corresponding physical media, the single group including a start address and an end address as a set. For example, as described above, row A in FIG. 3 includes a group 1 consisting of data from #120 (start address) to #150 (end address) corresponding to the first operation mode, Slow Scan; a group 2 consisting of data from #100 (start address) to #125 (end address) corresponding to the second operation mode, Play; and a group 3 consisting of data from #50 (start address) to #90 (end address) corresponding to the third operation mode, Fast Scan. Row B includes a group 4 consisting of data from #140 (start address) to #180 (end address) corresponding to the first operation mode, Slow Scan; and a group 5 consisting of data from #170 (start address) to #300 (end address) corresponding to the second operation mode, Play. By the way, with respect to groups 1 to 5, there are some overlapping addresses. A search table is created by regrouping so that such overlapping is eliminated and that the addresses are arranged in the ascending order (S50). That is, such regrouping as indicated below will be executed. The first address group consisting of data from #50 (start address) to #90 (end address); the second address group consisting of data from #100 (start address) to #119 (end address); the third address group consisting of data from #120 (start address) to #125 (end address); the fourth address group consisting of data from #126 (start address) to #139 (end address); the fifth address group consisting of data from #140 (start address) to #150 (end address); the sixth address group consisting of data from #151 (start address) to #169 (end address); the seventh address group consisting of data #170 (start address) to #180 (end address); and the eighth address group consisting of data from #181 (start address) to #300 (end address). Then, each search record of this search table is read, and the start and the end address of an operation history record registered in Step S47 is read in correspondence with the search record (S51, S52). It is judged whether or not there are overlapping addresses (S53). If there are overlapping addresses, then a weighing operation is performed on each address group so that a weight with a corresponding operation mode as a reference is given in Steps S54 to S58 interposed between points A and B. For example, a "weight 3" is given to the first operation mode, Slow Scan; a "weight 2" is given to the second operation mode, Play; and a "weight 1" is given to the third operation mode, Fast Scan. The reason why these weights are given to these operation modes is that there generally is a tendency to spend more time in observing and checking moving picture data if such data is of higher interest, i.e., such data is of higher importance. By the way, given such weights, weighing that is "1" is given to, e.g., the first address group consisting of data from #50 (start address) to #90 (end address) since the first address group corresponds to the third operation mode, Fast Scan. Since the second address group consisting of data from #100 (start address) to #119 (end address) corresponds to the second operation mode, Play, weighing that is "2" is given. And since the third address group consisting of data from #120 (start address) to #125 (end address) corresponds to the first operation mode, Slow Scan, and the second operation mode, Play, weighing that is "5" (2+3) is given. With respect to address groups from the fourth address consisting of data from #126 (start address) to #139 (end address) to the eighth address group consisting of data from #181 (start address) to #300 (end address), the weighing operation is similarly performed. The weighing operation is performed on all the address groups in Step S60 to complete a first search table. FIG. 5 shows a search table 50 obtained as a result of the weighing evaluations of the moving picture data to be searched in the above embodiment. In FIG. 5 a group ID is assigned to identify each address group in row X; an address corresponding to each address group (a set of specific start and end addresses) is listed in row Y; and a weight corresponding to each address group is given in row Z. Such search table 50 is temporarily stored, e.g., at a predetermined area in the operation history storage unit 15 and is used for the operation of finding an address group having the maximum weight, which will be described below.

In Step S62, which is a next step, a second search table 51 is created by sorting search records in the first search table 50. Then, a start address having the maximum weight among the search records is sequentially transferred to the control unit 12 (S63). As is apparent from the content of the search table 51 shown in FIG. 7, it is the start address (#140) of the fifth address group having the maximum weight "6" that is transferred in this example.

Figures 7, 8:
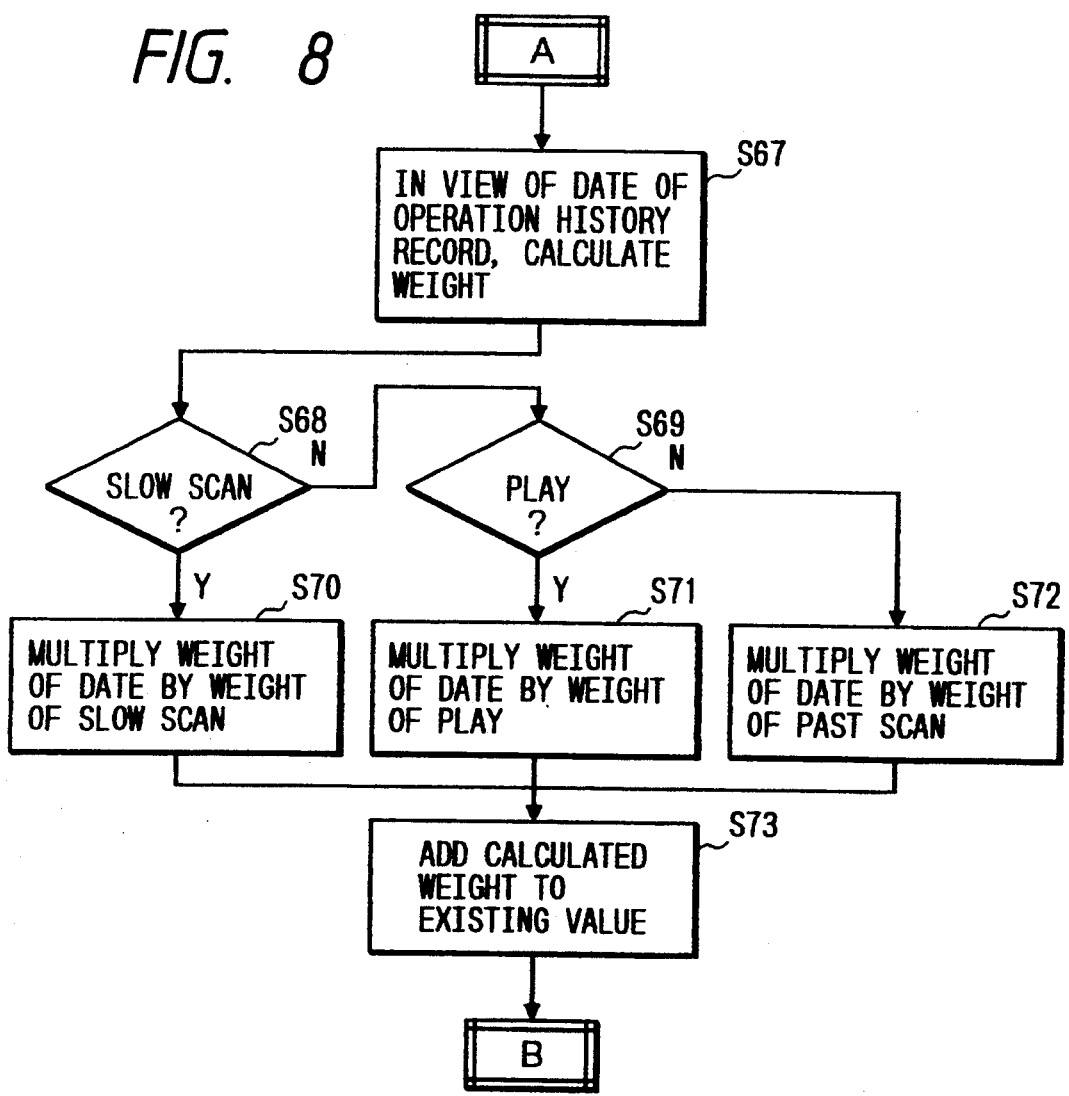
FIG. 7 is a diagram showing the concept of a second search table.
FIG. 8 is a flowchart showing a weighing operation in another embodiment.

When a start address (corresponding to an address group) of the moving picture data necessary for searching has been received by the control unit 12, such address is transferred to the media access unit 13. And a single page of image corresponding to the moving picture data at this address is displayed on the moving picture display unit 14 as a still image (S64). If the user who is monitoring the content of the moving picture display unit 14 instructs the control unit 12 to reproduce the image through the command input unit 11, then the media access unit 13 performs a predetermined operation under the control of the control unit 12 to reproduce the moving picture from the start address to the end address in the corresponding address group. This operation allows the user to check the content of the moving picture from the start to the end address of a single desired address group. As is understood from what has been described above, the operation of searching a necessary scene can be performed surely as well as quickly by sequentially identifying the contents of moving pictures corresponding to respective address groups from the larger to the lower weight. And when a desired image has been found and, e.g., when a user instruction for ending the search operation mode is detected, the search mode is ended (S65, S66), and the search table 51 shown in FIG. 7 is destroyed.

The weighing steps interposed between points A and B is not limited to those proposed in the above embodiment; steps involving the date may also be applicable. That is, as shown in FIG. 8, a larger weight is given to a newer date, and the weight of the date may be multiplied by the weight of the operation mode (S67 to S73).

Figure 9:
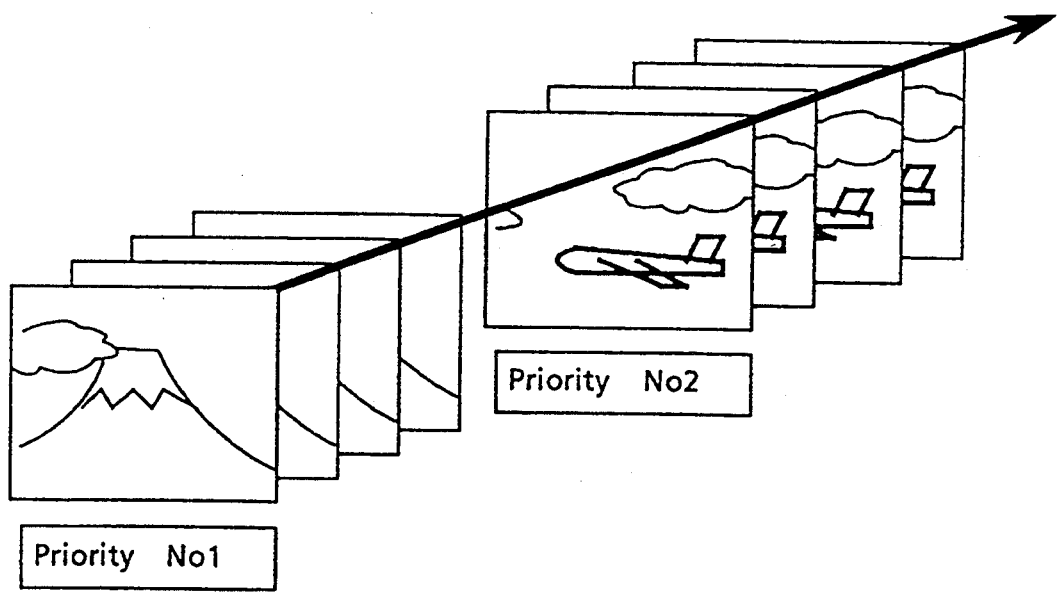
FIG. 9 is a diagram showing an exemplary display on a search screen.
Figure 10:
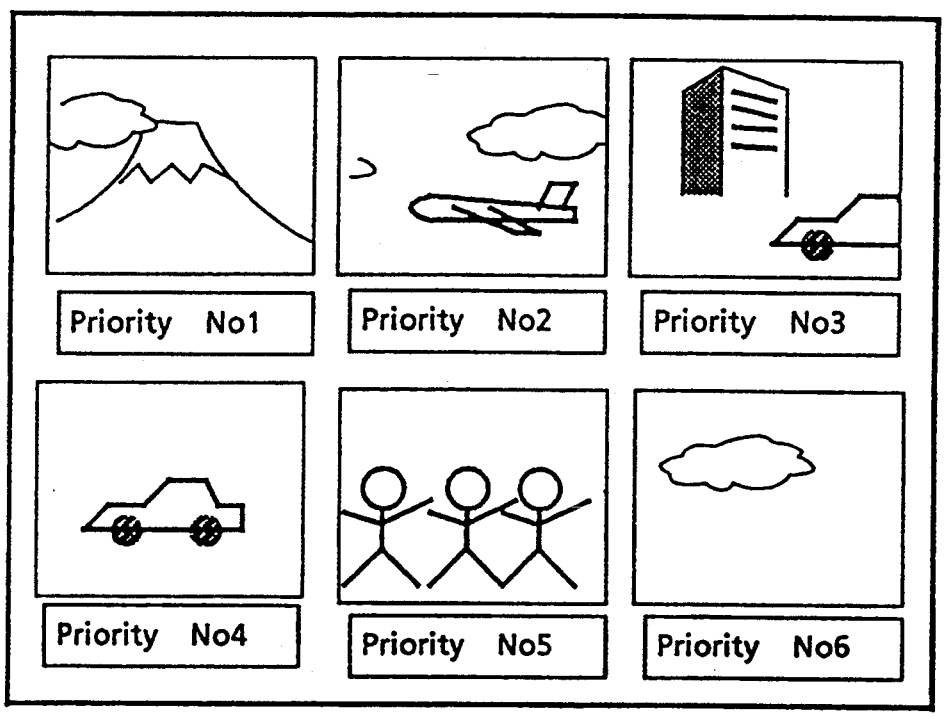
FIG. 10 is a diagram showing another exemplary display on the search screen.

While the case where only a single page of image selected every address group is displayed on the moving picture display unit 14 has been described in the above embodiment, application of the invention is not limited thereto. For example, images selected every address group are compressed to appropriate sizes and these images may be listed on the display screen in the order of weight (see FIGS. 9 and 10). Further, with respect to the operation history file, detailed time information such as hour, minute, and second may be stored in addition to the appended date information in the above embodiment. Such arrangement permits direct display. That is, the content of a certain moving picture file A that has been registered as of Oct. 22, 1990 (i.e., '90.10.22) can be directly displayed on the display unit 14 in a format exemplified in FIG. 6. What is understood from FIG. 6 is as follows. The Fast Scan operation of the moving picture file A is started at 10:50:35 on that day, and the processing of data from the corresponding start address 0 to end address 100 is executed. Then, the Play operation of the moving picture file A is started at 10:52:23, and the processing of data from the corresponding start address 100 to end address 500 is executed. At 11:02:24, the Play operation of the moving picture file A is resumed, and the processing of data from the corresponding start address 300 to end address 400 is executed. Then, at 11:05:07, the Slow Scan operation of the moving picture file A is started, and the processing of data from the corresponding start address 400 to end address 600 is executed. At 11:30:55, the Fast Scan operation of the moving picture file A is resumed, and the processing of data from the corresponding start address 600 to end address 700 is executed. A direct look at the operation history data in this format allows the user to identify several operations performed on the moving picture file A immediately before. Based on such identification, the desired scene or frame in a predetermined moving picture file can be searched quickly or the same operations can be repeated.

As described above, the moving picture search support device of the invention, which is used to reproduce a moving picture, is characterized as including: an operation history storage unit for storing history data that has been given a predetermined weight corresponding to an operation mode selected for processing a moving picture file by a user; and a history calculating unit that determines, in response to a search request made by the user for desired moving picture data within the moving picture file, a priority level at which the desired moving picture data is displayed in accordance with the predetermined weight based on the history data stored in the operation history storage unit. As a result of the above configuration, the desired moving picture data is searched and displayed quickly and surely without recourse to the user's vague memory.

What is claimed is:

1. A moving picture search support device comprising:
   an operation history storage means for storing history data of a moving picture file selected in the pest;
   a history calculating means for determining a priority level of an access group to be indicated by weighting based on said history data stored in said operation history storage means;
   a display means for displaying a result of said history calculating means; and
   said display means displaying as a still picture a part of a moving picture belonging to an access group.

2. The moving picture search support device as defined in claim 1 wherein said operation history storage means stores as history data a relationship between an operation mode of said moving picture selected in the past and an access range thereof.

3. The moving picture search support device as defined in claim 2 wherein said history calculating means comprises a regrouping means for finding an access group by regrouping a range in which no access ranges overlap and a range in which access ranges overlap in said operation history storage means.

4. The moving picture search support device as defined in claim 1 wherein said operation history storage means stores as history data a relationship between a date of said moving picture selected in the past and an access range thereof.

5. The moving picture search support device as defined in claim 1 wherein said operation history storage means stores as history data a relationship among a date of said moving picture selected in the past, an operation mode and an access range thereof.

6. The moving picture search support device as defined in claim 1 further comprising a registration means for registering history data of a selected moving picture file in said operation history storage means.

7. The moving picture search support device as defined in claim 6 wherein said registration means registers as history data a relationship between an operation mode of a selected moving picture and an access range thereof.

8. The moving picture search support device as defined in claim 6 wherein said registration means registers as history data a relationship between a date of said selected moving picture and an access range thereof.

9. The moving picture search support device as defined in claim 6 wherein said registration means registers as history data a relationship among a date of said selected moving picture, an operation mode and an access range thereof.

10. A moving picture search support device comprising:
- an input system for entering user instructions for selecting a movie from a media storage unit;
- an operation history storage system for storing history data of movie picture files selected for display in the past;
- a system for prioritizing and storing an order of display of portions of each movie selected for display in the past with weighting based on history data stored in the operation history storage system;
- a display system for displaying at least selected movie portions; and
- a search control system responding to a movie selection received from the input system and responding to the prioritizing and storing system to operate the display system to display at least portions of the selected movie in the stored prioritized order for display of portions of the selected movie.

* * * * *

UNITED STATES PATENT AND TRADEMARK OFFICE
CERTIFICATE OF CORRECTION

PATENT NO. : 5,416,693
DATED : May 16, 1995
INVENTOR(S) : Toshiaki YOSHINARI

It is certified that error appears in the above-indentified patent and that said Letters Patent is hereby corrected as shown below:

Claim 1, Column 8, Line 53, "pest" should read --past--.

Signed and Sealed this

Fifth Day of September, 1995

BRUCE LEHMAN

*Attest:*

*Attesting Officer*          *Commissioner of Patents and Trademarks*